Jan. 31, 1967   M. BARTH ET AL   3,301,520
RESILIENT SUSPENSION FOR TRACTOR SEATS AND THE LIKE
Filed June 28, 1965   2 Sheets-Sheet 1

INVENTORS
MANFRED BARTH
GÜNTER HUMMEL
REINHARD BLUMENTHAL
GERHARD HENDRICH
ERDMANN PULS
BY Karl F. Ross
ATTORNEY INVENTORS
MANFRED BARTH
GÜNTER HUMMEL
REINHARD BLUMENTHAL
GERHARD HENDRICH
ERDMANN PULS
BY Karl F. Ross
ATTORNEY United States Patent Office 3,301,520
Patented Jan. 31, 1967

3,301,520
RESILIENT SUSPENSION FOR TRACTOR SEATS
AND THE LIKE
Manfred Barth, Am Lerechenfeld 27; Günter Hummel, Strasse des FDGB 47; Reinhard Blumenthal, Birkenweg 4; Gerhard Hendrich, Birkenweg 6; and Erdmann Puls, Brechtstr. 35; all of Schonebeck (Elbe), Germany
Filed June 28, 1965, Ser. No. 467,440
15 Claims. (Cl. 248—399)

Our present invention relates to cushioned suspensions for the seats of automotive vehicles and especially for industrial, construction and agricultural tractors and tractor-like machinery in which the seating portions of the vehicle are floatingly suspended and are cushioned by resilient means to prevent the direct transmission of shock to the vehicle operator.

It is common practice in heavy-duty automotive vehicles and especially those operating in rough terrain, to suspend the seat-forming shell or bucket by a parallelogrammic linkage on the vehicle body and to provide resilient means for yieldably resisting displacement of this linkage. It is not uncommon, for example, to provide rubber cushions, pneumatically loaded springs, coil springs and torsion bars between the relatively displaceable elements of the suspension. Frequently, various lever systems are provided for preloading the spring means or changing the moment arm at which the spring is effective to take into consideration the changing weight of the operator and insure that the optimum oscillation frequency and damping and the distance by which the seat is displaced, remains substantially constant. Rubber springs, however, have the disadvantage that they age rapidly and lose their elastic characteristics and thus deteriorate with respect to the requirements of the resilient suspension. Coil springs are also disadvantageous in that the seat-mounting assembly is required to be relatively large when such springs are employed because of the considerable stroke of the spring; moreover, deflection of the spring results in a considerable change in the force constant with alteration of the dimension of the spring. Earlier torsion-bar springs permit an exact adjustment with minimum cost and insure a stable force constant. Conventional arrangements for mounting the torsion bars have, however, required relatively long torsion-bar arrangements to attain the desired force constant with respect to the angular deflection of the torsion bar required to yield a particular increase in restoring force. As a result, such systems have been used hitherto with only limited success in industrial, constructional and agricultural tractors.

It is the principal object of the present invention to provide a torsion-bar suspension for the seat portion of a vehicle which is substantially less complex than those required heretofore, which permits the maintenance of conditions of maximum comfort with respect to the elastic characteristics of the system, and which is more easily adjustable than earlier devices.

A further object of this invention is to provide a torsion-bar suspension for the seat of an automotive vehicle which will afford a relatively large stroke or seat movement and yet is relatively compact and can be adjusted with facility.

These objects and others which will become apparent hereinafter are attained in accordance with the present invention, by providing a seat-suspension arrangement for an automotive vehicle having a seat vertically shiftable relatively to a seat-support body carried by the vehicle chassis and coupled therewith by a parallelogrammatic linkage; at least one and preferably two bars are provided generally parallel to the parallelogrammatic links or within one or both of these links and are thus swingable about the articulation axis thereof while being provided with a force arm bearing at a location excentric with respect to the torque axis of the torsion bar for stressing upon loading of the seat member. We have found that a highly compact arrangement can be produced with excellent elastic comfort when the torsion bars are swingably entrained by the seat about a fulcrum and have an end provided with loading levers bearing against respective abutment members disposed at an adjustable distance from the respective torque axis. A relatively long portion of each bar projects beyond this fulcrum preferably below the seat-forming member. In general, therefore, the compact vehicle-seat suspension comprises a link means, usually two rigid link members, pivotally connected to the seat member and the support member while forming a parallelogrammatic linkage therebetween, for permitting substantially vertical movement of the seat member relatively to the support member while maintaining the orientation of the seating surface of the seat member; at least one torsion bar is swingable about a swingable axis of the link means and the members and extends generally transversely to this axis while projecting therebeyond and having one extremity anchored by retaining means against rotation about the axis of the bar. The other end of the bar is rotatable about its axis, i.e. an axis perpendicular to the aforementioned pivotal axis of the link means, and is provided with a force arm extending transversely to the bar and engageable with an abutment means on one of the seat and support member. According to this invention, the abutment means can be provided either on the vertically fixed support member or upon the vertically shiftable seat member and it will be understood that the following description pertains to both arrangements.

According to a more specific feature of the present invention, the retaining means by which the first end of the bar is anchored against rotation about the bar axis angularly adjustable to prestress the bar to any desired degree of loading. Advantageously, two torsion bars are provided each having a respective force arm, designed to apply torque to the bars in opposite senses. In this case, the retaining means for each of the bars can include a pair of levers and coupling means interconnecting these levers and adjustable to draw them together or shift them apart, thereby applying an angular stress to the bars for preloading them.

Still another feature of the present invention resides in the provision of adjusting means for varying the angular position, about the axis of each bar, at which the respective force arm bears upon the abutment means. Such adjustment means can include means for shifting the abutment means linearly in a direction perpendicular to the bar axis. Since the force arm is angularly displaceable about the bar axis, this linear movement of the abutment means can introduce a curvature in the spring characteristic of the torsion bar with movement of the abutment means. More specifically, it will be seen that each increment of movement of the abutment means results in an angular displacement of the force arm and thus a greater or lesser loading of the torsion bar assembly. A deviation from the normal spring characteristic, whereby the restoring force is equal to the product of a stiffness coefficient and the preloading displacement, results from the change in the effective length of the moment arm between the bar axis and the point at which the abutment means engages the force arm. This is apparent from the fact that equal increments of linear displacement of the abutment means will result in a nonlinear change in the effective length of the moment arm. It is, therefore, another feature of the present invention to provide a contact surface at which the abutment means engages the force arm which corresponds to a partial cylindrical surface whose axis, in a horizontal plane, is inclined to the bar axis. Moreover, the force arms preferably have engagement faces extending parallel to or inclined at an acute angle to the longitudinal median line of the force arm through the respective bar axis. This face can be provided with one or more rollers or shaped to the partial cylindrical configuration described above. When rollers are employed, they have axes inclined (in the horizontal plane) to the vertical axial plane of the respective torsion bar. The abutment means likewise can have a cylindrical face with correspondingly oriented axes or rollers engageable with the cylindrical face of the force arm.

According to still another feature of our invention, the control means for the abutment means includes a rotatable spindle extending athwart the torsion bars and substantially in the plane of their force arms and provided with a pair of oppositely threaded portions each having a respective carriage formed with the abutment surfaces and in engagement with the force arms. This facilitates the linear movements of the abutment means and ensures simultaneous adjustment of both of them. The adjustment means is thus stepless and permits an infinite variation of the loading of the torsion bars within the permissible range. The cylindrical configuration of the contact surfaces and the inclusion of the cylindrical axis insures that the loading moment of the torsion bars, within the range of motion of the seat member, remains constant or substantially so. Advantageously, the support and seat members are provided with indicating means including an indexing mark for permitting adjustment of the seat member for the correct seat positions in an unloaded position of the seat and in the various loaded conditions thereof. Moreover, we provide, in the seat suspension, a friction, pneumatic, hydraulic and/or spring damping device or shock absorber preferably between the linkage and the support member, for further improving the comfort of the operator by damping sudden shocks and reducing oscillations of the seat member.

The vehicular seat suspension described above permits ready adjustment of the spring loading of the seat member at relatively small expense and with a relatively compact system. The torsion bars can extend the full length of the seat and thus can have a greater degree of angular displacement than possible heretofore. There is no need to restrict the torsion bar to the length of the pivots or to have them extend parallel to these pivots and thus interfere with the operation of the vehicle. The system also permits a relatively constant effective spring moment of the force arm to be maintained even during swinging motion of the torsion bars about the linkage axis perpendicular thereto when, for example, the seat member is fully depressed. In practice, it has been found that a completely linear effective moment arm can be obtained with the configuration of the contact surface described above.

The above and other objects, features and advantages of the present invention will become more readily apparent from the following description, reference being made to accompanying drawing in which.

Figure 1:
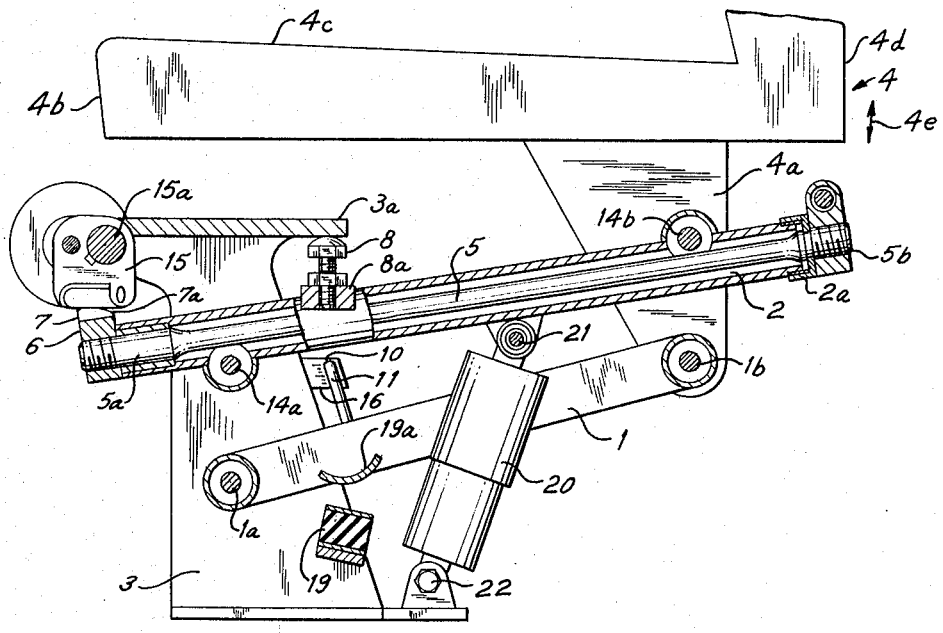
FIG. 1 is a vertical cross-sectional view, partly in elevation, of a seat suspension for a tractor-type vehicle according to this invention.
Figure 2:
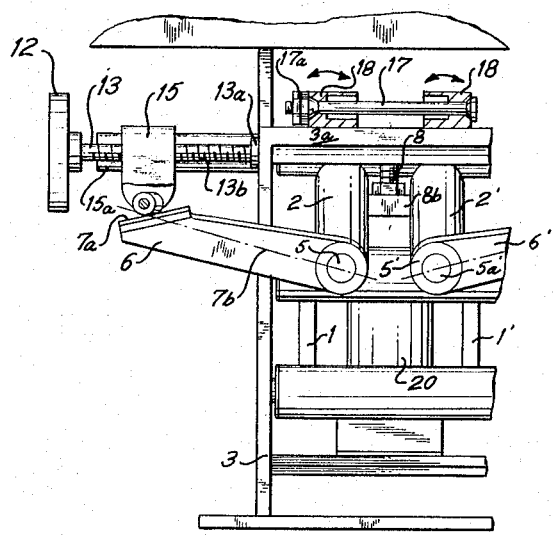
FIG. 2 is a front view of the suspension.
Figure 3:
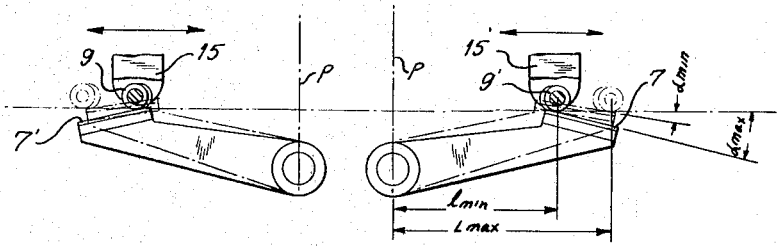
FIG. 3 is a front view diagrammatically showing the relationship between the abutment means and the force arm in different positions of adjustment.
Figure 4:
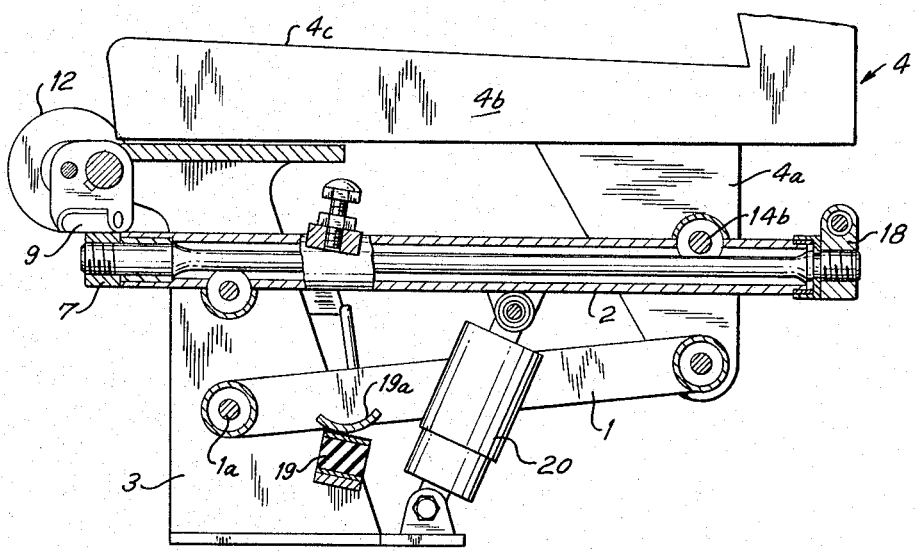
FIG. 4 is a view similar to FIG. 1, showing the vehicle seat fully depressed.

In FIGS. 1, 2 and 4, we show a seat suspension in which the vertically fixed or inelastic portion or support member 3 of the automotive vehicle (i.e. an agricultural, industrial or construction tractor) forms a post upon which a parallelogrammatic linkage 1, 2 is swingable. While only one parallelogrammatic linkage is required for the purpose of the present invention, two are employed for the preferred suspension illustrated. Primed numerals will be used hereinafter to designate corresponding elements of the second parallelogrammatic linkage and torsion-bar assembly not seen in FIGS. 1 and 4. The rigid link member 1 is hinged at 1a and 1b to the support member 3 and a depending portion 4a of the seat member 4 whose seat shell or bucket 4b has a seat surface 4c and a back rest 4d in the usual manner. The rigid link 2 is constituted as a tube which is pivoted at 14a to the support member 3 and at 14b to the seat member 4. The pivots 1a, 1b, 14a and 14b are disposed at the vertices of a parallelogram so that the rigid links 1 and 2 serve to maintain the orientation of the seating surface 4c in spite of the fact that the seat is vertically shiftable (arrow 4e). It will be seen from FIG. 2 that two such tubular link members 2, 2' are provided each with a respective torsion bar 5, 5' which projects beyond the pivot (one shown in 14a) whose pivotal axes extend perpendicularly to the bars 5, 5'. The bars 5, 5' have corresponding ends 5a, 5a' freely rotatable within the respective tube 2, 2' and projecting therefrom so that a force arm 6, 6' can be keyed to the torsion bars for rotatable entrainment thereby about the axes of the torsion bars. The arms 6, 6' are provided with contact elements 7, 7' which form with the adjustable abutment means of the support member 3 a cylindrical surface 7a whose axis lies in a horizontal plane but is inclined to the vertical plane P, P' of the bar axis. The complementary element of the abutment means bearing against each force arm 6, 6' is a roller 9, 9' mounted in a carriage 15, 15' slidable horizontally along a rail 15a extending across the front of the support member 3. The carriages 15, 15' are linearly displaceable by a threaded spindle 13 journaled at 13a to the support member 3 and provided with oppositely threaded portions 13b etc., respectively engaging the carriages 15 and 15'. Upon rotation of the hand-wheel 12 of the spindle 13, the carriages 15, 15' are displaced toward or away from one another depending upon the sense of such rotation. The rollers 9, 9' of the carriages 15, 15' have their axes in a common horizontal plane but inclined to the respective vertical planes P, P' (FIG. 3).

At the rearmost ends of the arms 5, 5', we provide adjustable retaining means for preventing rotation of these extremities of the torsion bars. Thus these ends 5b etc. extend beyond caps 2a etc. at the forward extremity of the link 2 and are keyed to respective levers 18, 18' which are interconnected by a coupling means consisting of a swivel-headed bolt 17 whose swivel nut can be tightened to draw the free ends of the levers 18, 18' toward one another. The coupling means thus constitutes a means for adjusting the retaining means and for preloading the torsion bars 5 and 5' by twisting them in opposite senses. From FIG. 2, it can be seen that the surface 7a etc. of the force arms 7 etc. are inclined to the respective longitudinal median line 7b etc. through the respective arms. The screw 17 thus permits the preloading of both torsion bars 5 and 5' to be established at identical levels. Since the carriages 15 and 15' are linearly displaceable, the cylindrical contact surfaces between the contact elements 7a, 9 and 9' compensate for the nonlinear deviation of the effective lever arm when the seat member 4 is shifted from its position illustrated in FIG. 1 to that of FIG. 4. Within the effective moment-arm range from $l_{min.}$ to $l_{max.}$ and with adjustment angles in the region from $\alpha_{min.}$ to $\alpha_{max.}$ the system is adjustable continuously and substantially infinitely in accordance with the weight of the vehicle operator. To permit compensation of the system for the unloaded and loaded weight of the seat, we provide an indexing means consisting of a scale 16 whose upper edge forms an indexing mark which, when aligned with the indexing member 11 carried by the movable link 1, designates the proper location of the seat-forming member in the unloaded state of the suspension. This position can be adjusted accurately by means of an adjustable stop 8 which bears upon the underside of platform 3a and is threaded at 8a onto the links 2, 2' via a crossbar 8b. When the seat is to be used by operators of different weights, the preloading can be established by rotation of handwheel 12 to bring the pointer 11 into alignment with other scale divisions of the scale 16. A damper-type shock absorber 20 is articulated at 21 to the links 2, 2' and at 22 to the stationary portions of the suspension. The shock absorber can be of the liquid or gas-damping types or can be provided with friction-damping means in the conventional manner. A rubber buffer 19 is engageable with a stop 19a bridging the lower link members 1 etc. for cushioning any total downward movement of the seat member 4.

The invention described and illustrated is believed to admit of many modifications within the ability of persons skilled in the art including the mounting of arms 7, 7' on the ends 5b etc. and the provision of abutment means on the seat 4, all such modifications being considered within the spirit and scope of the appended claims.

We claim:
1. In a vehicle, in combination with a seat member and a support member, a vehicular seat suspension for resiliently mounting said seat member upon said support member, said suspension comprising link means pivotally connected to said seat member and said support member while forming a parallelogrammatic linkage therebetween for permitting substantially vertical movement of said seat member relatively to said support member while maintaining the orientation of the seating surface of said seat member; at least one torsion bar swingable about an axis of a pivot connecting said link means with said members and extending generally transversely to said axis, while being entrainable by said seat member for rotation about said axis; retaining means anchoring one end of said bar against rotation about the axis of said bar, the other end of said bar being rotatable about the axis thereof; a force arm extending generally transversely to said bar and secured to said other end thereof; and abutment means engageable by said arm and formed on one of said members for resisting rotation of said other end.

2. A vehicular seat suspension as defined in claim 1 wherein said link means includes a pair of rigid like members each pivotally connected with said seat member and said support member at two vertices of a parallelogram defined by the pivots of both link members, said torsion bar extending generally parallel to one of said link members.

3. A vehicular seat suspension as defined in claim 2 wherein said torsion bar extends through said one of said link members.

4. A vehicular seat suspension as defined in claim 1 wherein said arm and said abutment means are provided with contact elements having a common engagement surface, said bar lying in a vertical plane.

5. A vehicular seat suspension as defined in claim 4 wherein said surface conforms to a partial surface of an imaginary cylinder having an axis in a horizontal plane inclined to the vertical plane through the axis of said bar and dimensioned such that the effective moment arm of said force arm is substantially constant in substantially all positions of said seat member.

6. A vehicular seat suspension as defined in claim 4 wherein said element of said arm is inclined at an acute angle to the longitudinal median line through that arm.

7. A vehicular seat suspension as defined in claim 4 wherein one of said elements is a roller having an axis in a horizontal plane inclined to the vertical plane of the bar axis.

8. A vehicular seat suspension as defined in claim 7 wherein said abutment means is provided with said roller.

9. A vehicular seat suspension as defined in claim 7 wherein the other of said elements forms a cylindrical face with an axis in the horizontal plane inclined to the vertical plane of the bar axis.

10. A vehicular seat suspension as defined in claim 9 wherein said other of said elements is carried by said arm.

11. A vehicular seat suspension as defined in claim 1 further comprising control means for adjusting the angular position of said force arm about the bar axis.

12. A vehicular seat suspension as defined in claim 11 wherein said control means includes a spindle extending generally in a horizontal plane in a direction transversely of said bar, said abutment means being threadedly engageable with said spindle for linear displacement thereby toward and away from the bar axis.

13. A vehicular seat suspension as defined in claim 12 wherein a pair of said torsion bars are provided in generally parallel horizontally spaced relationshp, each of said torsion bars having a respective force arm carried upon the corresponding ends of said bars and swingable in opposite senses for loading said bars, said abutment means including a pair of abutment carriages mounted upon said spindle in engagement with the respective force arms, said spindle having oppositely threaded portions, respectively engaging said carriages for displacing them toward and away from one another upon rotation of said spindle in one or another sense.

14. A vehicular seat suspension as defined in claim 13 wherein each of said arms and their respective carriages are provided with a pair of mutually engaging contact elements defining a respective contact surface, said bars each lying in a respective vertical plane, said surfaces each corresponding to a partial surface of an imaginary cylinder having an axis in a horizontal plane inclined to the vertical plane of the respective bar.

15. A vehicular seat suspension as defined in claim 13 wherein each of said bars is provided with respective adjustable retaining means at the end of the bar remote from its force arm, said retaining means including a pair of levers each connected with the respective bar, and coupling means interconnecting said lever for drawing them toward one another and displacing them away from one another, thereby angularly rotating said levers about the respective bar axes for preloading said bars.

References Cited by the Examiner

UNITED STATES PATENTS

| | | | |
|---|---|---|---|
| 2,971,569 | 2/1961 | Parrott et al. | 248—373 |
| 3,025,032 | 3/1962 | Leja | 248—399 |
| 3,061,260 | 10/1962 | Simons et al. | 248—399 |
| 3,203,661 | 8/1965 | Brendel | 248—399 |

CLAUDE A. LE ROY, *Primary Examiner.*

R. P. SEITTER, *Assistant Examiner.*